United States Patent Office 3,495,155
Patented Feb. 10, 1970

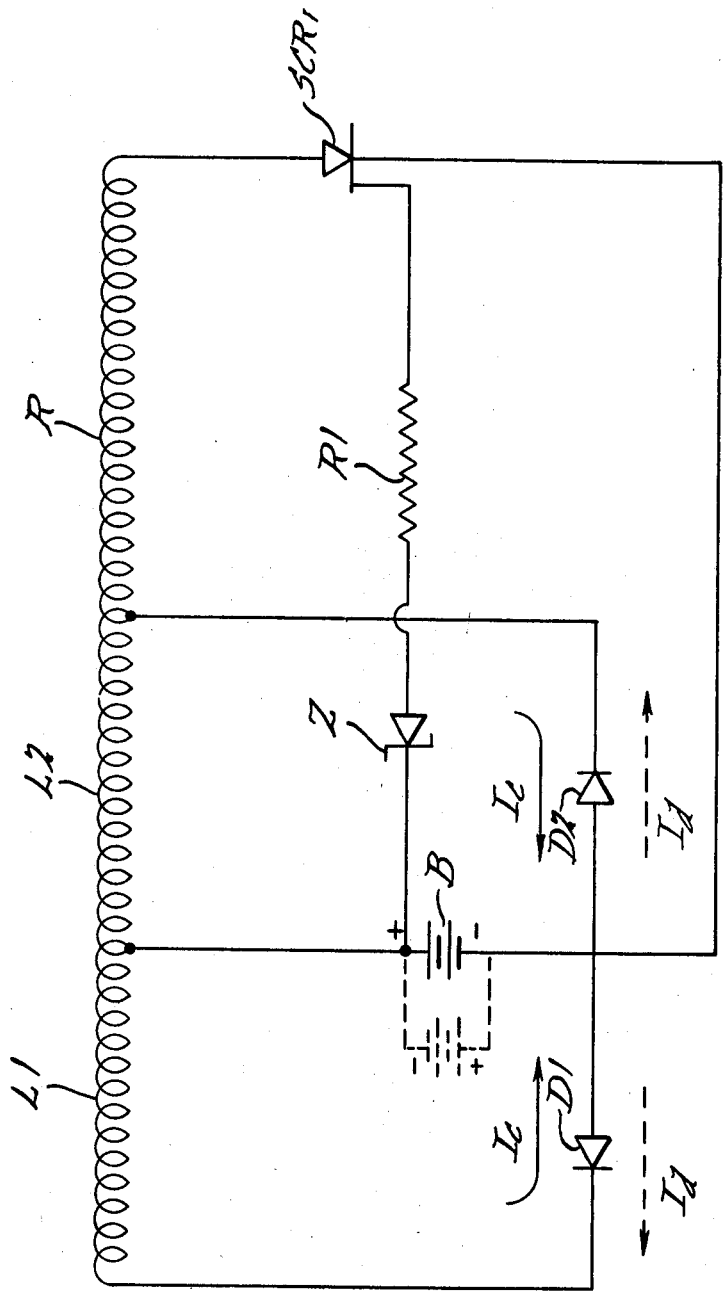

3,495,155
REGULATED GENERATOR WITH DIODE PROTECTION
Richard J. Maier, Pontiac, Mich., assignor to Syncro Corporation, Oxford, Mich., a corporation of Michigan
Filed July 13, 1967, Ser. No. 653,162
Int. Cl. H01m 45/04
U.S. Cl. 320—25     8 Claims

ABSTRACT OF THE DISCLOSURE

A center tapped load winding having a resistance preventing damage to diodes connected thereto in the event the circuit to the diodes is inadvertently incorrectly connected.

---

The present invention relates to generating systems and more particularly to a regulated generator having diode protection.

In the present invention a novel generator circuit having diode protection is provided; therefore, it is an object of the present invention to provide a novel generator circuit.

In the present invention generator load windings are connected to a battery via diodes whereby charge current is provided to the battery; the load winding is center tapped with each part connected to a diode; the resistance of each part is selected to provide current protection to the associated diodes such that in the event the battery is connected to the circuit in reverse the diodes will not be damaged by the resultant current.

Therefore, it is an object of the present invention to provide a novel generator circuit in which the resistance of the load winding is of a magnitude to protect the associated solid state components.

It is a general object of the present invention to provide a novel generating system.

Other objects, features, and advantages of the present invention will become apparent from the subsequent description and the appended claims, taken in conjunction with the accompanying drawings, in which the drawing is a schematic diagram of a preferred form of the generating system of the present invention with that portion shown in dotted lines representing the circuit with the battery incorrectly connected in reverse polarity.

In the drawing a battery B is shown to be charged by means of current generated by a pair of load windings L1, L2, each of which has one end connected to the positive side of the battery B with the other side of load winding L1 being connected to the ground side of the battery B via a diode D1 and the other side of the load winding L2 being connected to the ground side of battery B via a diode D2. The diodes D1 and D2 provide for rectification of the potential generated by the load windings L1 and L2. Regulation is provided by a regulating winding R which has one end connected between the juncture of the load winding L2 and the diode D2 and its other end connected to the anode of an SCR S1 which has its cathode connected to the ground side of the battery B. The gate of the SCR S1 is connected to the positive side of the battery B via a biasing resistor R1 and a Zener diode Z. The load windings L1 and L2 and regulating windings R are wound upon the same poles of a stator. The alternator and regulator as shown and described are of a construction generally similar to and function in a manner generally similar to that of the alternator and regulator shown and described in the copending patent application of Thomas F. Carmichael et al., Ser. No. 199,811, filed June 4, 1962, now Patent No. 3,270,268. Thus the potential across battery B is sensed by means of the Zener diode Z such that when it reaches a preselected level indicating battery B to be charged the Zener diode will break down, permitting a gate to cathode current flow to the SCR S1 permitting it to conduct, whereby a substantially low impedance or short circuit path is provided across battery B through the regulating winding R thereby reducing the resulting potential applied by the load windings L1 and L2 across the battery B.

Note that with the circuit as shown and with battery B as connected, battery current would want to flow in direction Ic but is blocked and cannot flow through diodes D1 and D2. When the battery B, however, is improperly connected in reverse (as shown in dotted lines) the diodes D1 and D2 then can conduct and current will flow in the direction Id. Unless there is sufficient impedance in the circuit of the diodes D1 and D2 the battery current Id will be of sufficient magnitude to destroy them.

In circuits using a single, non-center tapped load winding normally a full wave rectifier bridge is used with the load winding connected across two legs of the bridge. The battery is connected across the other two legs of the bridge and when it is connected with the proper polarity relative to the diodes of the bridge no battery current will flow through the diodes since they will be in blocking relationship; however, if the battery is inadvertently connected in reverse polarity across the bridge the diodes will then be forward biased or in a conductive relationship across the battery. In this condition the forward impedance of the diodes only is in series with the battery and the resultant high current will destroy the diodes; note that the short circuit current with this latter construction will not pass through the local winding. In such constructions it has been necessary in order to obtain diode protection to either add substantial additional circuitry or to add components reducing the efficiency of the unit; in the first instance, components have been added in the past, to sense the polarity of the connected battery such as to hold the charge circuit through the diodes open unless the battery is conneced with the proper polarity; in the second instance losser type of impedances i.e. resistance have been added in series circuit with the diodes to limit the short circuit current in the event of a reverse polarity connection; in the latter instance this losser type of impedance is continuously in the circuit and hence reduces the efficiency of the charging device substantially.

With the construction of the present invention the resistance of the load windings L1 and L2, which is present in all such devices whether they be center-tapped or not, is utilized to provide a protective function and is placed in series with the diodes D1 and D2 of the battery B.

Thus with the use of a center-tapped construction it has been found that the resistance of windings L1 and L2 provide a current limiting characteristic without impairing the battery charging capability of the generator. It is necessary, however, that the windings L1 and L2 be selected to have a sufficient resistance relative to the diode rating such that the current battery B under a reverse polarity connection will be limited to a safe magnitude at which the diodes D1 and D2 will not be destroyed; it has been found that the windings L1 and L2 can be provided with the proper magnitude of resistance with out appreciably impairing the functioning of the generator while still protecting the diodes from overload current destruction. This is a substantial departure from the prior construction previously described in which an external, separate resistance was used to provide protection and in which the efficiency of the device was, as a result, substantially impaired. With the battery B having a voltage V and with the allowable forward current of the diodes D1 and D2 being a current I the required resistance for each of the windings L1 and L2 will be a resistance greater than the result of $V/I$. For example, it has been found that with a battery B having a voltage of approximately 12.6 volts the resistance of windings L1 and L2 can be set at around .5 ohm and sufficiently limit the current through diodes D1 and D2, which for the application noted would have a capacity of 30 amperes in the forward direction.

While it will be apparent that the preferred embodiment of the invention disclosed is well calculated to fulfill the objects above stated, it will be appreciated that the invention is susceptible to modification, variation and change.

What is claimed is:

1. In an alternator having a load winding electrically connected to a battery whereby the battery receives charge current the improvement comprising: circuit means connecting the winding to have a center-tap and connections at opposite ends with the battery connected with said center-tap, a pair of solid state unidirectional conducting means each connected to one of said opposite ends to the winding, said conducting means connected to conduct charge current from the winding to the battery when the battery is located in said center tap with a pre-selected polarity, each section of the winding on opposite sides of said center-tap having a preselected number of turns to provide a preselected potential to charge the battery, each of said sections of the winding having a preselected resistance, said preselected resistance having a magnitude relative to the current conducting capacity of said conducting means and the remainder of the resistance of said circuit means connecting said conducting means and said sections to the battery such that in the event the battery, when fully charged, is inadvertently connected in reverse polarity said preselected resistance will limit the current to a selected magnitude below the maximum magnitude sustainable by said conducting means whereby said conducting means is not damaged by said selected magnitude of current, said remainder of the resistance being defined by conductors of low resistance.

2. The apparatus of claim 1 with each said conducting means comprising a diode.

3. The apparatus of claim 2 with said sections having a resistance of at least around .5 ohm.

4. The apparatus of claim 2 with said improvement further comprising a regulating winding serially connected with one of said sections and with a controlled conduction device.

5. The apparatus of claim 4 with said controlled conduction device comprising a controlled rectifier having a control electrode connected to the battery for rendering said controlled rectifier conducted in response to a preselected potential across the battery whereby the battery is shunted by a substantially low impedance path including said one of said sections, said regulating winding and said controlled rectifier.

6. The apparatus of claim 3 with said improvement further comprising a regulating winding serially connected with one of said sections and with a controlled conduction device.

7. The apparatus of claim 6 with said controlled conduction device comprising a controlled rectifier having a control electrode connected to the battery for rendering said controlled rectifier conductive in response to a preselected potential across the battery whereby the battery is shunted by a substantially low impedance path including said one of said sections, said regulating winding and said controlled rectifier.

8. The apparatus of claim 2 with each said diode having said maximum magnitude of I amperes and with the battery having a potential of V bolts with the direct current resistance of said each section being greater than the result of $V/I$.

References Cited

UNITED STATES PATENTS

| | | | |
|---|---|---|---|
| 3,213,349 | 10/1965 | Gutzwiller | 317—43 X |
| 3,270,268 | 8/1966 | Carmichael et al. | 320—61 |
| 3,314,001 | 4/1967 | Brockman | 317—43 X |
| 3,400,318 | 9/1968 | Hill | 322—93 X |
| 3,406,318 | 10/1968 | Harland et al. | 317—43 |

JAMES D. TRAMMELL, Primary Examiner

STANLEY WEINBERG, Assistant Examiner

U.S. Cl. X.R.

310—179, 195; 320—61; 322—95

PO-1050
(5/69)

UNITED STATES PATENT OFFICE
CERTIFICATE OF CORRECTION

Patent No. 3,495,155      Dated February 10, 1970

Inventor(s) Richard J. Maier

It is certified that error appears in the above-identified patent and that said Letters Patent are hereby corrected as shown below:

Column 2, line 31, delete "local" and substitute therefor --load--
Column 2, line 38, delete "conneced" and substitute therefor --connected--
Column 2, line 57, after "current" insert --from--

SIGNED AND
SEALED

JUL 14 1970

(SEAL)
Attest:

Edward M. Fletcher, Jr.
Attesting Officer

WILLIAM E. SCHUYLER, JR.
Commissioner of Patents